Aug. 4, 1959    J. WEISE ET AL    2,897,738
SETTING ARRANGEMENTS FOR FLASH SHUTTERS
Filed Sept. 20, 1956    4 Sheets-Sheet 1

INVENTOR.
BY Johannes Weise
and
Rolf Noack

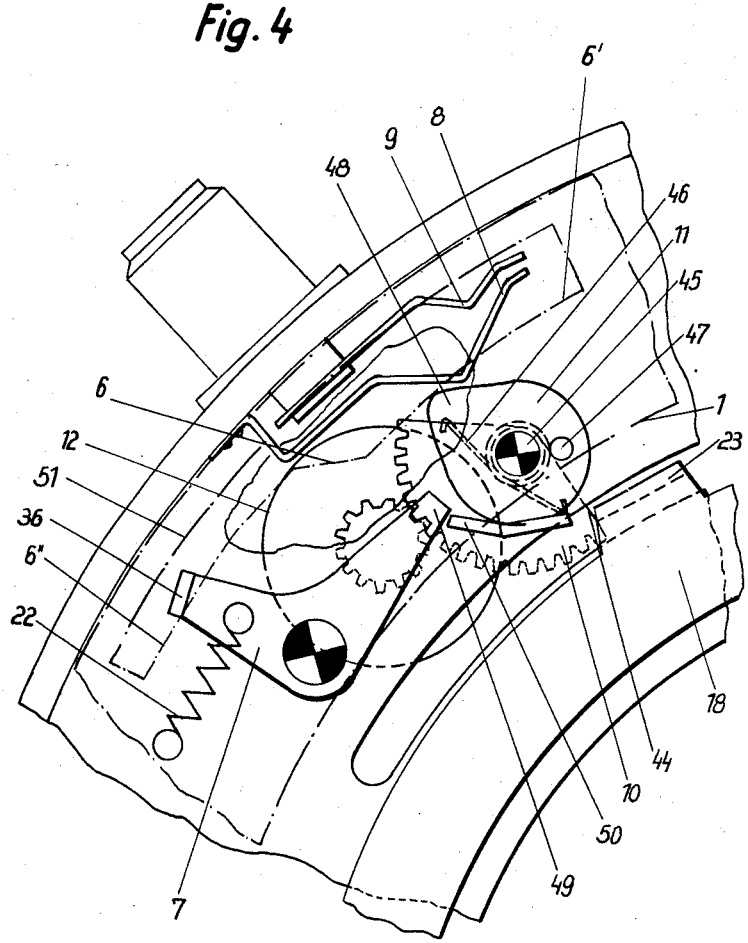

Aug. 4, 1959
J. WEISE ET AL
2,897,738
SETTING ARRANGEMENTS FOR FLASH SHUTTERS
Filed Sept. 20, 1956
4 Sheets-Sheet 4
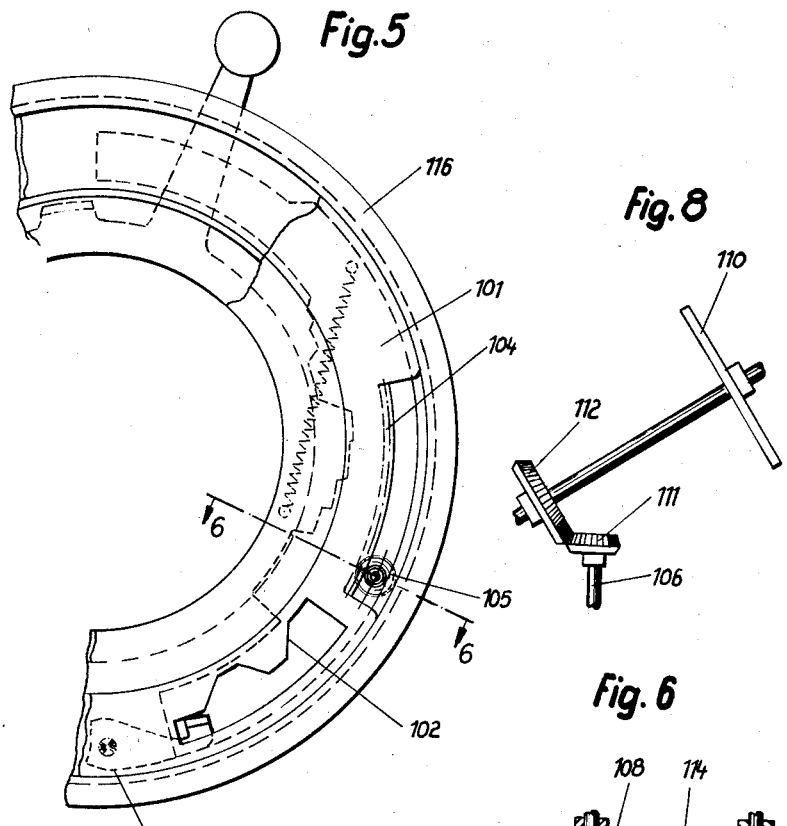
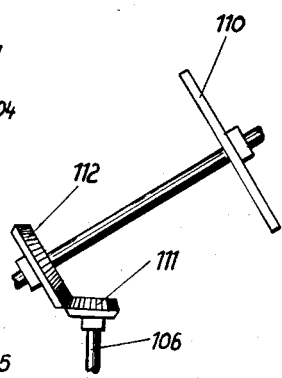
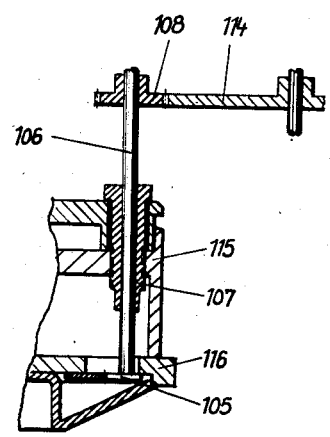
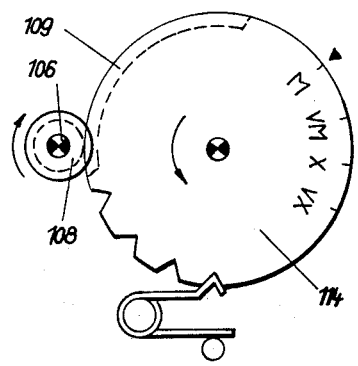
INVENTOR.
BY Johannes Weise
and
Rolf Nozck

United States Patent Office 2,897,738
Patented Aug. 4, 1959

2,897,738

SETTING ARRANGEMENTS FOR FLASH SHUTTERS

Johannes Weise and Rolf Noack, Dresden, Germany, assignors to VEB Zeiss Ikon Dresden, Dresden, Germany Application September 20, 1956, Serial No. 611,069

Claims priority, application Germany September 21, 1955

9 Claims. (Cl. 95—11.5)

This invention relates to shutters for photographic purposes and more particularly to a setting arrangement for shutters having a built-in flash contact mechanism and a built-in delay or timing mechanism by means of which the shutter may be selectively released.

Modern shutters and in particular between-the-lens shutters, commonly comprise built-in timing mechanisms and flash contact mechanisms which latter often are provided with settable blocking or controlling means for the purpose of rendering possible the attainment of different flashing times, i.e. different classes of flashes and flash synchronization, so that flash lamps with or without flash delay may be used. The more adjustable the flash contact mechanism and preferably also the timing mechanism are, the easier is the attainment of proper flash synchronization, i.e. to make the shutter open and the flash lamp reach the peak at the same time.

It is an object of this invention to provide a setting arrangement for shutters of the kind referred to by means of which the simultaneous setting of both the flash contact mechanism with its controlling means—if any—and the timing mechanism is obtained in an easy and simple manner.

Another object of this invention is the provision of means for bringing both the flash contact mechanism and the timing mechanism into an operative condition during the tensioning of the shutter.

Still another object of this invention is the provision of a setting arrangement by means of which the flash contact mechanism may be set for different classes of flashes for operation with or without the timing mechanism.

Moreover, it is an object of this invention generally to improve on the construction and manipulation of shutters having built-in flash contact mechanisms and built-in timing mechanisms as now customarily made.

Figures 1, 2:
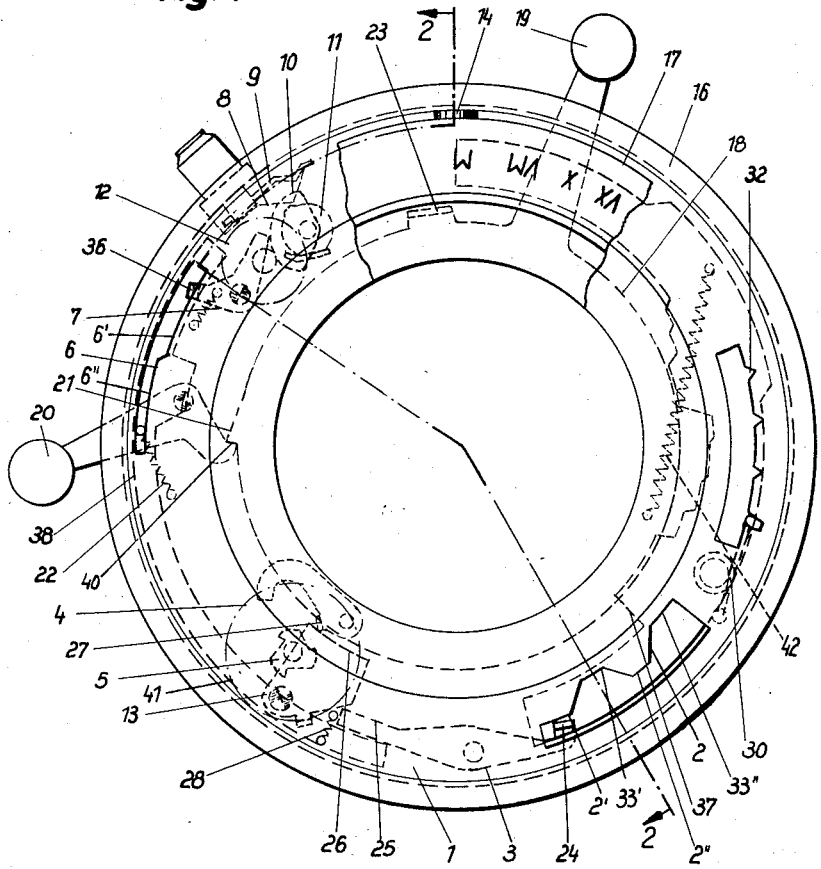
Figure 3:
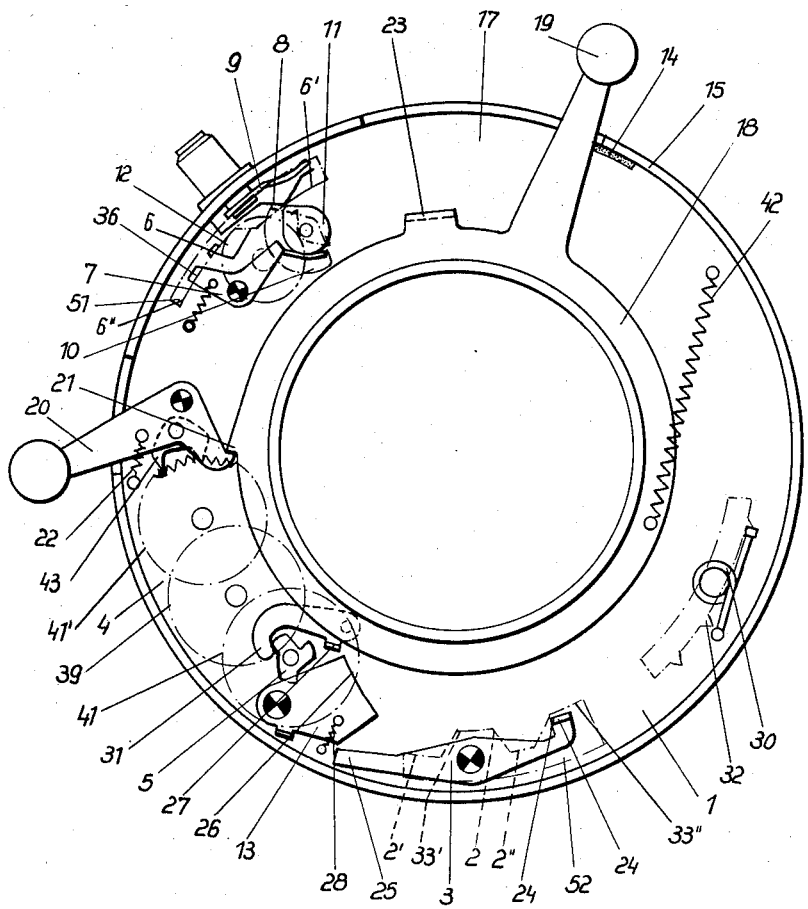

Other objects and structural details of the invention will be apparent from the following description when read in conjunction with the accompanying drawings forming part of this specification, wherein:

Fig. 1 is a somewhat diagrammatical front elevational view of a camera shutter in accordance with a first embodiment of this invention, the shutter being shown in tensioned position with the built-in timing or delay mechanism disconnected and the built-in flash contact mechanism set into operative condition for delayed flashing action, Fig. 2 is a sectional view on line 2—2 of Fig. 1, Fig. 3 is a front elevational view of the first embodiment of the shutter with the elements of the shutter concealing the interior thereof, however, being omitted, and the shutter again being shown in tensioned position while the timing mechanism is connected i.e. in operative condition and the flash contact mechanism is set for causing the firing of a flash without delay, Fig. 4 is a front elevational view on a larger scale of the flash contact mechanism as shown in Fig. 3, Fig. 5 is a front elevational, fragmentary view of a setting arrangement built into a shutter and adapted to be manipulated by means provided on the camera proper, Fig. 6 is a sectional view on line 6—6 of Fig. 5, Fig. 7 is a plan view of the section presented in Fig. 6, and Fig. 8 shows in elevation a further modification of an arrangement for the actuating means of a setting arrangement in accordance with this invention.

Referring now to the drawings and in particular to Figs. 1–3, reference numeral 15 indicates the casing for a lens shutter. Only those parts of the shutter necessary for the understanding of the invention are shown. A setting ring 16 is rotatably mounted on the front side of the casing 15. This setting ring 16, which serves for setting the desired exposure time during the shooting of pictures, will hereinafter be referred to as "time setting ring." In accordance with this invention a further setting ring 1 (see Fig. 2) is mounted between the time setting ring 16 and a front plate 17 which latter covers the shutter towards the front. The setting ring 1 is provided with two, spaced apart cams 2 and 6. The cam 2 of the setting ring 1 is destined to operate, i.e. to connect or disconnect, a delay or timing mechanism generally and schematically indicated by reference numeral 4, while the cam 6 is provided for controlling the operation of a flash contact mechanism generally and schematically indicated by reference numeral 12. It will be noticed that cam 2 has two crests 2' and 2" and two depressions 33' and 33" whereas cam 6 has a rather long depression 6' and also a rather long crest 6". For a purpose to be explained later, a lug 24 co-operates with cam 2 and a lug 36 co-operates with the cam 6. The relative positions of the cams is such that if lug 24 engages the crest 2' or the depression 33', lug 36 bears on the depressed cam portion 6', and that if lug 24 engages the crest 2" or the depression 33" lug 36 bears on the crest 6". For the purpose of facilitating the manipulation i.e., rotation of the setting ring 1, the latter is provided with a crank or handle portion 14, seen best in Fig. 2, which projects from the front face of the shutter. The setting ring 1 may thus be readily rotated by means of the handle portion 14 and the setting ring 1 will be arrested in its various positions relative to the shutter proper by means of a spring 30 engaging in the appropriate notch of a plurality of notches 32 as indicated in Figs. 1 and 3.

The tensioning mechanism for the shutter comprises a spring-loaded rotatably mounted tensioning ring 18 (Figs. 1 and 3) provided with a grip or handle 19 and having a projecting nose or abutment portion 21 adapted to cooperate with a bearing surface 40 of a pivotally mounted, spring-loaded release lever 20. When the handle 19 is turned in clockwise direction, the tensioning ring 18 will reach a position in which the release lever 20—under the action of its spring 22—snaps into engagement with the tensioning ring 18 so that the bearing surface 40 bears on the nose 21. The shutter is thus tensioned under the action of spring 42. The tensioning of the shutter is advantageously effected together with the film advance. This position is shown in Figs. 1 and 3. The tensioning ring 18 is also provided with a driving lug 23 and a claw or pawl-shaped member 31 which latter is pivotally mounted on the tensioning ring 18. The driving lug 23 is destined to cooperate with the flash contact arrangement 12 and the claw-shaped member is capable of cooperation with the timing mechanism 4. The position of the lug 23 and the claw-shaped member 31 on the tensioning ring 18 is chosen in such a manner that the tensioning referred to brings the lug 23 and the claw member 31 into an operative position, i.e. a position in which they are capable to perform their respective functions. The lug 23 and the claw member 31, thus act as pre-setting means for the flash contact and timing mechanism respectively. Whether or not these functions are to be utilized, i.e. whether or not the flash contact mechanism 12 and/or the self-timing mechanism 4 are to be brought into action upon release of the shutter is dependent on the particular position of the setting ring 1 with its cams 2 and 6. If desired, for example, the setting ring 1 may be brought into a position in which a flash of the kind commonly known as "class X" is fired and this particular kind of flash release may be combined with the use of the timing mechanism 4. It is of course also possible to set the flash contact mechanism so as to cause the firing of a flash of the kind known as "class M" and to combine such flash release with the operation of the timing mechanism. It will be realized that any desired kind of flash synchronization can be obtained.

Fig. 1 illustrates the case in which the timing mechanism 4 is disconnected while the flash contact mechanism is set for a class M flash. The timing device 4 i.e. the delaying mechanism for self-exposures comprises a train of gears of which the first one is denoted by 41 and the last one by 41'. This train of gears is shown in Fig. 3 but has been omitted in Fig. 1. The gear 41 is secured to a ratchet wheel 5 whereas an escapement 43 engages the teeth of the gear 41'. Pivoted to the tensioning ring 18 is a pawl or claw member 31 for cooperation with the ratchet wheel 5. It will be clear that in the position shown in Fig. 1, the pawl is disengaged from the ratchet wheel, that, however, in the position of Fig. 3 when ring 18 tends to turn in the counterclockwise direction under the action of spring 42, the pawl 31 will turn the ratchet wheel and the train of gears at a speed controlled by the escapement 43 until the pawl slides off the ratchet wheel. Upon tensioning of the ring 18, the pawl will be returned to its operative position. The timing arrangement 4 is accomplished by causing the disengagement of the claw member 31 from the ratchet wheel 5. This disengagement of the timing mechanism 4 is effected by the provision of the following mechanism. The cam 2 of the setting ring 1 is adapted to bear on a bearing lug 24 of one arm of a rockably mounted, two-armed lever 3. The other arm 25 of this lever 3 in turn cooperates with a rockably mounted, spring-loaded setting lever or plate 13. This plate 13 has a bearing edge 26 adapted for cooperation with a bearing lug 27 of the claw member 31. When the setting ring 1 is placed into a position in which its cam 2 comes to bear on the bearing lug 24 of the two-armed lever 3, the two-armed lever 3 is rocked about its pivot so that the arm 25 rocks the plate 13, whereby the edge 26 bears on the bearing lug 27 of the claw or pawl member 31 and disengages the latter from the ratchet wheel 5. The timing mechanism is then in its inoperative position, i.e. it no longer cooperates with the function of the shutter.

The flash contact mechanism set for a class M-flash in Fig. 1 and which is more clearly visible in Fig. 4, comprises the cooperating contact springs 8 and 9 which are provided to close the lamp circuit. A toothed segment 10 serves as driving member for the contact mechanism. When the tensioning ring 18 turns under the action of spring 42, lug 23 hits the edge 44 of the toothed segment 10. Owing thereto, the latter will be turned about the pivot pin 45 in the clockwise direction. The M-contact lever 11 is also journaled about this pin. A spring 46 couples this lever to the segment 10 in such a manner that the spring 47, secured to lever 11, urges this lever 11 towards the edge 44 of the toothed segment 10. Owing to this coupling, the M-contact lever 11, on account of spring 47, will also be taken along in the clockwise direction. The cam 48 of lever 11 thereby will bear on the contact spring 8 and urge it against the stationary contact spring 9 so that the flash bulb circuit will be closed.

A different setting position is illustrated in Fig. 3. In this position the timing mechanism 4 is operatively connected with the tensioned shutter while the means for effecting a class M flash are blocked. As previously pointed out, the M flash is released when the lamp circuit is closed by establishing contact between the contact springs 8 and 9. Such circuit closure is however prevented in the position shown in Fig. 3 by arresting the actuating means embodied by the contact lever 11 which latter otherwise is capable of pressing the movable contact spring 8 against the stationarily mounted counter spring 9. The lever 11 is now arrested so that this lever— upon release of the tensioning ring 18—is prevented from following the driving member 10. Arresting of the lever 11 is accomplished when the arm 49 of lever 7 is positioned in front of a lug 50 of the contact lever 11 which then cannot turn in a clockwise direction and is not affected by the running off of the tensioning ring while the driving member 10 is actuated by the driving lug or presetting means 23 of the tensioning ring 18. This in turn results in the fact that the circuit for a class M flash as embodied by the contact springs 8 and 9 cannot be closed. The particular setting shown in Fig. 3 of the flash contact mechanism 12 and the timing mechanism 4 is accomplished in the following manner: The cam 2 of the setting ring 1 has a groove or depression 33″ and the ring 1 is set in such a manner that the bearing lug 24 of the two-armed lever 3 engages in this groove 33″. This in turn results in the fact that the setting lever 13 of the timing arrangement 4 is rocked about its pivot in clockwise direction under the action of the spring 28 into an inoperative position. The claw member 31 is thus no longer prevented from contact with the ratchet wheel 5 and accordingly rocks about its pivot until it is in engagement with the wheel 5. The arresting of the actuating means or lever 11 of the flash contact mechanism is accomplished at the same time in the following manner: The cam 6 of the setting ring 1 acts on a bearing lug 36 of a pivotally mounted, spring-loaded blocking lever 7 of the flash contact mechanism. The action of the cam 6 on the lug 36 causes the rocking of the lever 7 into a position in which the latter arrests the movement of the lever 11. The lever 11 thus cannot press the movable contact spring 8 towards and against the stationarily arranged contact spring 9. The circuit for the flash lamp is thus not closed prior to the beginning of the exposure process but it is closed when the shutter is wide open. This belated closure of the lamp circuit may be effected in known manner by a moving contact means which is preferably directly or indirectly coupled to the blades of the shutter and closes the lamp circuit only when the shutter is fully open. However, since this second switch does not enter into the present invention, it will not be described herein.

As has become apparent from the preceding description, the time setting ring 16 is situated between the setting ring 1 on the one side and the two-armed lever 3 of the timing mechanism and the blocking lever 7 of the flash contact mechanism on the other side. With a view to establishing a connection between the cams 2 and 6 of the setting ring 1 and the lug 24 of the two-armed lever 3 and the lug 36 of the blocking lever 7, respectively, in spite of the interposition of the time setting ring 16, the latter is provided with slots or bores 37 and 38 (see Fig. 1) through which the lugs 24 and 36 project, whereby the cams 2 and 6 may directly act on these lugs. Similarly, setting ring 1 is provided with recesses 51 and 52 forming with their inner edges the cams 6, 2 and 33, respectively, for control and cooperation with lug 36 of lever 7 and lug 24 of the two-armed lever 3. Now it will be clear that the one ring element 1 allows selectively four different settings, viz. the timing mechanism being inoperative or operative while in each instance the flash contact mechanism may also be either operative or inoperative.

Figs. 5–8 illustrate embodiments wherein the inventive setting arrangement for the shutter may be manipulated from a place on the camera proper. As can be seen, the time setting ring 116 and the annular setting means 101 for setting the flash contact mechanism and the timing mechanism are rotatably mounted within the casing 115. The setting means 101 corresponds to the setting ring 1 shown in Figs. 1–4 and is thus provided with cam means for setting the flash contact mechanism and the timing mechanism. In order not to overcrowd the drawing, only the cam means 102 and the two-armed lever 103 of the timing mechanism controlled by the cam means 102 have been illustrated in Fig. 5. The setting means 101 is further provided with a toothed portion 104 which meshes with a pinion 105. The bearing shaft 106 of the pinion 105 is mounted in and passes through a bushing or sleeve 107 having an exterior thread. The shaft 106 projects from the shutter casing 115 rearwardly. A further pinion 108 (see Figs. 6 and 7) engages the projecting end of the shaft 106. The pinion 108 meshes in turn with a toothed portion 109 of a setting disc 114 which may be provided with suitable scales indicating the different settings to be obtained. Due to the coupling mechanism comprised by the elements 104—109, the setting means 101 is thus operatively connected with the setting disc 114 which may be arranged anywhere on the camera body.

Fig. 8 illustrates an embodiment wherein the setting means 101 is coupled to a setting disc 110 by means of bevel gears 111 and 112. The setting disc may thus be arranged in inclined position, for example on the front face of the camera.

From the above description it will be gathered that the invention considerably simplifies the manipulation, setting and construction of flash shutters. The blocking or controlling means of the flash contact mechanism and the timing mechanism are brought into operative condition simultaneously with the tensioning of the shutter by the provision of pre-setting means on the tensioning means. Thus, no additional manipulation or measure is required for tensioning either the blocking or controlling means of the flash contact mechanism or the timing mechanism. This is accomplished by the shutter tensioning mechanism with the pre-setting means. The pre-setting means effect the actuation of the flash contact mechanism and the timing mechanism upon release of the shutter. Further, according to the invention a single setting means as embodied for example by the elements 1 and 101 is provided by means of which both the flash contact mechanism and the timing mechanism are set simultaneously. The setting means comprises advantageously a ring—in case "between-the-lens" shutters are concerned—which ring has separate cam means for acting on the flash contact mechanism and timing mechanism respectively. The flash contact mechanism may be settable for different flashing times, i.e. different flash synchronization may be effected, while the timing mechanism may also be adjustable for different timings and may or may not be used together with the flash contact mechanism. It will thus be realized that the electrical circuit for the flash lamp may be closed at will so that excellent flash synchronization in dependence on the shutter speed and opening is effected and the shutter is thus wide open at the exact time the flash lamp reaches its peak.

Further, the inventive construction renders it possible to effect self-exposures with flash lamps having delayed flashing action. Moreover, by simply manipulating a single setting means, the flashing mechanism of the shutter is completely and efficiently set in accordance with the particular respective exposure conditions. In case "between-the-lens" shutters are concerned, the setting means are advantageously ring-shaped and arranged so as to be rotatable about the optical axis of the camera.

Due to the inventive construction it is rendered feasible to fire not only the common class X and class M flashes in conjunction with or without the timing mechanism, but any desired flashing times, i.e. class of flash firing, as for example 5, 10, 15, 20 ms. or the like may be set and used jointly with the timing mechanism. For the purpose of thus effecting different settings it is only required to equip the flash contact mechanism with controlling means as for example lever means which are capable of exerting varying blocking actions on the flash contact mechanism and which in turn are actuated and operated by the cam means of the setting means. In a shutter in which the flash contact mechanism can be set for class X and class M flashes only, it is advantageous to construct the flash contact mechanism with its controlling means in such a manner that, if the flash contact mechanism is set for class X flashes, the actuating means, for example a lever, for the class M flashes is blocked by the corresponding position of the cam means of the setting means. The actuating means for the setting means, i.e. for example a handle or grip necessary for the easy manipulation of the setting means protrudes advantageously from the front face of the shutter or the camera body proper so that it is easily accessible.

The inventive arrangement may equally successfully be used in focal plane shutters. In this case the construction of the setting means will have to be somewhat altered so as better to conform with the different space conditions. In this case it is advantageous to construct the setting means as a shaft or a slide.

Further, the manipulating means or actuating means for the setting means may be arranged at any desired place on the camera body proper. Such a construction is for example obtained if a setting disc is provided which is positively coupled with the setting means. This setting disc may then be arranged at any convention place on the outside of the camera body. The coupling means may comprise gears meshing with both the setting means and the setting disc. In order to obtain a particularly simple coupling between the setting means and the setting disc, the former is provided with a toothed portion meshing with a pinion. The bearing shaft of the pinion protrudes preferably rearwardly from the shutter or lens housing and is operatively connected with the setting disc.

We have described preferred embodiments of our invention, but it is understood that this disclosure is for the purpose of illustration and that various changes in shape and proportion, as well as the substitution of equivalent elements for those herein shown and described, may be made without departing from the spirit and scope of the invention as set forth in the appended claims.

What we claim is:

1. In a photographic lens shutter, the combination of a releasable shutter tensioning ring, a flash contact device including a flash retarding mechanism, a first settable means for rendering said flash contact device inoperative, a delaying mechanism for self exposures, said tensioning ring including a means for operating said retarding mechanism and another means for coupling said delaying means to said tensioning ring when said tensioning ring is released from tensioned condition, a second settable means for rendering said coupling means inoperative, and a setting ring having four positions and including two means cooperative with said settable means, respectively, so as to provide for any selective combination of operative or inoperative conditions of both said settable means.

2. A device as in claim 1, each of said settable means including a two-armed lever and said setting ring including a first and a second cam surface, one arm of said first lever being in engagement with said first cam surface and the other arm of said first lever being adapted to be turned by said first cam surface into a position in which it blocks the movement of the contact-making part of said flash contact device, and the one arm of said second lever being in engagement with said second cam surface and the other arm of said second lever being adapted to block said other means of said tensioning ring from coupling with said delaying means.

3. In a photographic lens shutter, the combination of a releasable shutter tensioning ring, a flash contact device including a flash retarding mechanism, a first settable means including a first two-armed lever adapted to be turned with its first arm into the path of a contact-causing part of said flash contact device thereby to render said flash contact device inoperative, a delaying mechanism for self exposures, said tensioning ring including a means for operating said retarding mechanism and another means for coupling said delaying means to said tensioning ring when said tensioning ring is released from tensioned condition, a second settable means including a second two-armed lever adapted to be turned with its first arm into the path of a coupling-causing part of said coupling means thereby to render said coupling means inoperative, and a setting ring having a first cam surface engaging the second arm of said first lever and having a second cam surface engaging the second arm of said second lever, one of said cam surfaces having two crests alternating with two depressions, and the other cam surface having one crest and one depression, and manipulating means connected to said setting ring for turning the latter.

4. A device as in claim 3, said means for operating said retarding means and said means for coupling said delaying means being connected to said tensioning ring in relation to said flash contact device and said delaying device, respectively, so as to be brought into condition for operation when said tensioning ring is being tensioned.

5. A device as in claim 3, said setting ring being provided with four rests coordinate with said two crests and two depressions on said one cam surface, and a stationary spring adapted to snap into one of said rests according to the setting of said setting ring.

6. In a shutter as claimed in claim 3, said manipulating means including a handle portion rigid with said setting ring and projecting from the shutter for easy handling and access.

7. In a shutter as claimed in claim 3, said manipulating means including a setting disc, and a gear mechanism operatively connecting said setting disc with said setting ring.

8. In a shutter as claimed in claim 3, said manipulating means including a setting disc, said setting ring including a toothed portion, said toothed portion meshing with a pinion, and said pinion having a shaft which rearwardly projects from said shutter and is operatively connected to said setting disc outside said shutter proper.

9. In a shutter as claimed in claim 3, said manipulating means including a setting disc positioned in inclined position relative to the shutter, said setting ring including a toothed portion, said toothed portion meshing with a pinion, and said pinion having a shaft projecting from the shutter and being operatively geared to said setting disc.

References Cited in the file of this patent
UNITED STATES PATENTS

| | | |
|---|---|---|
| 2,596,671 | Fuerst | May 13, 1952 |
| 2,655,085 | Gebele | Oct. 13, 1953 |
| 2,727,445 | Rentschler | Dec. 20, 1955 |